United States Patent [19]

Krofta

[11] Patent Number: 5,567,319

[45] Date of Patent: Oct. 22, 1996

[54] HIGH CAPACITY SINGLE TANK WATER CLARIFICATION METHOD

[75] Inventor: Milos Krofta, Lenox, Mass.

[73] Assignee: Lenox Institute of Water Technology, Inc., Lenox, Mass.

[21] Appl. No.: 431,885

[22] Filed: May 1, 1995

Related U.S. Application Data

[62] Division of Ser. No. 84,411, Jun. 29, 1993, Pat. No. 5,415, 771.

[51] Int. Cl.⁶ ...................................................... C02F 1/24
[52] U.S. Cl. ........................ 210/703; 210/776; 210/221.2
[58] Field of Search ..................................... 210/703, 707, 210/776, 221.2, 221.1, 520, 530, 540

[56] References Cited

U.S. PATENT DOCUMENTS

| | | |
|---|---|---|
| 2,874,842 | 2/1959 | Krofta . |
| 3,067,878 | 12/1962 | Genter . |
| 3,182,799 | 5/1965 | Krofta . |
| 3,452,869 | 7/1969 | O'Neill . |
| 3,820,659 | 6/1974 | Parlette . |
| 4,022,696 | 5/1977 | Krofta . |
| 4,184,967 | 1/1980 | Krofta . |
| 4,346,005 | 8/1982 | Zimmerman . |
| 4,377,485 | 3/1983 | Krofta . |
| 4,626,345 | 12/1986 | Krofta . |
| 4,931,175 | 6/1990 | Krofta . |
| 5,078,861 | 1/1992 | Krofta . |
| 5,139,662 | 8/1992 | Ozawa . |
| 5,160,611 | 11/1992 | Krofta . |
| 5,176,835 | 1/1993 | Perletti . |
| 5,188,729 | 2/1993 | Krofta . |
| 5,296,149 | 3/1994 | Krofta . |

FOREIGN PATENT DOCUMENTS 1101262  7/1984  U.S.S.R. .

*Primary Examiner*—Thomas M. Lithgow
*Attorney, Agent, or Firm*—Peter J. Manus, Esq.

[57] ABSTRACT

Raw feed water is continuously clarified at a large throughput rate in a single, shallow tank using a flotation process carried out simultaneously in multiple sectors of the tank. Raw water feeds into a rotating trough. A fixed manifold system in the trough dispenses pressurized water containing dissolved air to release microscopic air bubbles. A set of headers each radially extend outwardly from the rotating trough. Each header distributes water and bubbles to a sector of the tank with a net zero velocity. A set of rotating extractors each receive clarified water from the bottom of a preceding sector. A set of scoops skim floated sludge from the water in the tank. The sludge is lifted, as by the rotation of the scoop and/or by a pumped conduit, over the rotating trough to a sludge outlet pipe. In one form the scoop has at least two blades each with an eccentrically located, radially extending compartment that receives, lifts, and then dumps the skimmed sludge as the scoop rotates about its axis.

5 Claims, 3 Drawing Sheets

HIGH CAPACITY SINGLE TANK WATER CLARIFICATION METHOD

This is a divisional of application Ser. No. 08/084,411 filed on Jun. 29, 1993 (now U.S. Pat. No. 5,415,771).

BACKGROUND OF THE INVENTION

This invention relates in general to apparatus and a process for the flotation clarification of water. More specifically, it relates to an apparatus and process where multiple such processes are carried out simultaneously in a single tank to provide an extremely high treatment rate with a high degree of compactness.

Water clarification, the removal of particulate contaminants suspended in water, is used to treat waste water from manufacturing processes, particularly in the pulp and paper industries, in the treatment of municipal water drinking supplies, and in sewage treatment. The water can be clarified by sedimentation or flotation of the particles. Known sedimentation techniques and apparatus are efficient, but even at peak efficiency they are limited to a comparatively slow sedimentation rate, about 0.5 gallons per minute per square foot. To handle large volumes of raw input water, sedimentation facilities must therefore be large, with attendant cost and space utilization disadvantages.

Flotation techniques dissolve a few percent of air by volume in pressurized water and then release the air in the form of microscopic bubbles which attach to the particles and carry them to the surface where they form a floating sludge. The particles are usually flocculated using conventional flocculating agents such as alum. Flotation techniques are theoretically capable of achieving clarification rates of 7.5 gallons per minute per square foot of flotation area.

Applicant holds several U.S. patent on apparatus and processes for water clarification by flotation. U.S. Pat. Nos. 2,874,842 and 3,182,799 introduce gas bubbles to a tank with no moving components inside or over the tank. Internal deflectors and baffles guided the water and the flotation process; the turbulence of the water was minimal and did not present a design problem. This equipment, however, operated slowly.

U.S. Pat. No. 4,022,696 describes an improved clarifier of applicant sold commercially under the trade designations "SPC", "Supracell", and "Supercell". Flotation occurs in a circular tank. Raw water is fed from a raw water inlet pipe at the center of the tank, a hydraulic joint, and a manifold that rotates about the tank. The inlet flow from the manifold is directed opposite to the direction of rotating so that the raw water entering the tank has a net zero velocity. Flocculation occurs in a flocculation chamber, an assembly of pipes, walls and baffles that is immersed in the tank and rotates on a carriage with the manifold. Another rotating manifold introduces dissolved air to the flotation tank following the flocculation assembly. A rotating scoop, preferably a multiple blade scoop of the type described in applicant's U.S. Pat. No. 4,184,567 is also carried on the carriage. It scoops the floated sludge from the surface of the tank and directs it to a central pipe that is inclined to gravity feed the collected sludge to a central collection compartment.

The carriage rotates about the tank at a rate such that the floated particles reach the surface in about one rotation. With a flotation rate of 12 inches per minute, a good degree of clarification can be achieved with each rotation using a comparatively shallow tank, e.g. 16 to 18 inches of water. While these units, operated in this manner, are much more efficient than the earlier stationary equipment, and in general they are highly successful, they do not provide a throughput capacity that can handle a large municipal treatment plant without utilizing a large number of the apparatus. For example, to treat raw water input at 8 to 9 $m^3$/sec would require more than twelve SPC units of the largest size, a 70 foot (about 22 m) diameter which processes 11,800 gallons per minute, or 0.73 $m^3$/sec. This many units has serious disadvantages in terms of capital cost, operating cost, and space utilization. Further, simply increasing the size of each unit and operating it at a faster speed does not provide an acceptable solution since the increased speed of rotation of the carriage required to take advantage of the increased size creates turbulence as the flocculation assembly and dissolved air manifold move through the water with an increased velocity. Also, a net zero velocity operation is more difficult to achieve at higher rotational speeds.

U.S. Pat. No. 4,377,485 discloses a clarifier (sold under the trade designation "SAF") operating with the same features as the SCP unit, but adding a second filtration stage, a set of sand beds covering the bottom of the tank. While the clarified water is cleaner than with a comparable SPC unit, the SAF has a higher initial cost and does not increase the filtration rate.

U.S. Pat. No. 4,626,345 discloses a further clarifier sold under the trade designation "SASF". This unit does not employ the SPC's zero velocity principle, but it does offer two stage filtration with sand at a favorable cost and compactness as compared to the SAF unit. Raw water in this unit enters a central cylindrical compartment at the bottom. This compartment acts as a hydraulic flocculator. Aerated water is introduced to this central compartment by a fixed manifold located near the upper end of the compartment. Flocculated and aerated water is fed to a clarification tank by flowing over the upper edge of the cylindrical compartment into the surrounding tank. This unit provides good clarification with a compact unit, but it does not offer the throughput capacity or overall performance of the SPC or SAF units.

U.S. Pat. No. 4,931,175 discloses another SPC-type clarifier where a set of concentric, conical plates rotate within the tank to increase the length of the path traversed by the rising bubbles. With this arrangement, it is possible to increase the treatment capacity of a given diameter tank, with the increase being roughly approximated by the degree to which adjacent ones of these conical plates overlap one another. A 50% increase in the flotation rate, for example, is well within theoretically possible limits. However, in practice it has been found that it is difficult to obtain consistent increases that equal the theoretical maximum. Moreover, even if the inclined plates worked as well as theoretically possible, they would not increase the treatment capacity of an SPC unit sufficiently to treat raw water at throughput rates as high as 8–9 $m^3$/sec, values necessary in certain applications such as the treatment of the municipal waste of a major city by retrofitting existing sedimentation tanks with a fixed area.

It is therefore a principal object of this invention to provide a flotation-type water clarification apparatus and process which has a greatly increased filtration rate for a given diameter tank.

Another principal object is to provide a clarifying system with this greatly increased rate in a compact size that does not require significant additional space, e.g. room for multiple known SPC-type clarifiers.

A further object is to provide a clarifying system with the foregoing advantages that has a comparatively low capital cost and weight as compared to a comparably sized SPC or SAF unit.

Another object is to provide a clarifying system with the foregoing advantages that can retrofit existing sedimentation units.

Yet another object is provide a scoop that removes floated sludge at a high rate and lifts it to promote its movement to a collection compartment.

A still further object is to provide a flotation clarifier with all of the foregoing advantages that has a simplified water distribution and level control that avoids rotary seals, particularly at a raw water inlet feeding flotation tank.

SUMMARY OF THE INVENTION

A clarifier of raw water carrying suspended particulate contaminants is organized about a generally cylindrical, shallow tank that is open at its center to accommodate an inlet pipe for the raw water, which preferably has been treated with a flocculating agent, and a sludge removal pipe. The sludge removal pipe is preferably capped by a conical funnel that directs sludge collected from the surface of the tank by a set of scoops to the pipe. The funnel preferably overlies an upward flow of raw water from the inlet and then downward to a fixed trough that surrounds the inlet. The raw water overflows the outer cylindrical wall of the fixed trough to a surrounding, rotating trough having a bottom wall and inner and outer cylindrical walls. The inner wall is preferably in a sliding seal with the outer wall of the fixed trough, being engaged at its upper end in a downwardly facing flange fixed on the outer wall of the fixed trough. A supply of pressurized water contained dissolved air is directed by distribution ring set in the fixed trough, feed conduits bridging to the rotating trough, and a set of manifolds with a plurality of narrow-gap outlets to the rotating trough. A supply of treated raw water containing microscopic air bubbles for flotation clarification is thus created in a compact area, without the use of a rotary seal or sophisticated water level controls.

The rotating trough feeds water and bubbles to the tank via a set of headers that extend radially from the trough into the tank. The headers are preferably box-like, relatively flat, wide in the direction of rotation, and occupy an upper portion of the tank. This configuration permits a small profile in the direction of rotation to reduce turbulence created by movement of the headers in the water. The circumferential "width" provide an unrestricted flow path from the trough into the header and acts as a small, local supply of aerated raw water within the tank. This reduces the turbulence of the water as it enters the tank. The box preferably has a cross sectional area that increases slightly with the radius to present a generally uniform pressure profile as a function of radius. Multiple outlets feed the water from the header to the tank. The outlets are spaced and sized to feed a roughly equal volume of raw water to the tank at any given radius. Significantly, they are also directed generally opposite to the direction of rotation so that the water entering the tank has a net zero velocity. The headers are preferably equiangularly spaced with respect to one another.

A spider-like carriage rotates around the tank. It supports the headers and a like array of radially extending extractors. Each extractor receives clarified water from the bottom of the tank via a set of inlets preferably arrayed along the front or bottom surfaces of a box-like structure similar to the headers. Each extractor is associated with a header and preferably positioned ahead of the headers to withdraw water that has been clarified in the sector of the tank between that extractor and the immediately preceding header. The headers and extractors form sets of rotating radially directed lines of water distribution and extraction.

Clarified water proceeds through each header to an annular collection chamber located below the rotating trough, and defined in part by the outer wall of the trough and its bottom wall. In the preferred form a sliding contact seal such as a rubber skirt secured on the outer wall of the tank forms the seal. The collection compartment empties directly to a clarified water outlet pipe. Also in the preferred form, the extractor has a sediment rake secured to it that scrapes large particles that settle in the tank to one or more sediment collection sumps that feed outlet pipes.

The floated, flocculated contaminants collect on the surface of the water held in the tank as a floating layer of sludge. There is preferably a scoop mounted on the carriage with each header—extractor pair. The scoop has at least one and preferably two blades that extend radially over the tank. The scoop rotates about its own axis as well as being rotated about the center of the tank on the carriage. In each revolution of the scoop it skims sludge from the tank, lifts it above the surface of the water, and then dumps it onto an inclined slide that guides the sludge to the funnel and the sludge removal pipe. To lift the sludge, each blade directs skimmed sludge to an associated compartment which is radially offset from the axis of rotation of the scoop. The compartment is configured to dump the sludge during a position of each rotation, when the sludge is carried by the rotation to a point raised over the surface of the water. In another form, the sludge is directed to a known passageway at the center of the scoop which is in turn inclined to feed the sludge toward the center of the tank. There a conduit and a pump lift the sludge to an inclined trough that bridges the rotating trough and directs the sludge to the funnel.

Broadly stated, the process of the present invention involves operating multiple clarification sectors simultaneously in a single tank. To implement this process, the invention involves distributing raw water to the tank along angularly spaced, radially directed lines, removing clarified water from the tank along n angularly spaced, radially directed lines, rotating these lines in unison to define rotating sectors of clarification within the tank each defined by one of the lines of distribution and a following line of removing, and clarifying the water in each of said sectors by flotation. The process further includes removing floated sludge from the surface of the tank, preferably along plural rotating, radially directed lines. The distributing of the water to the tank is with a net zero velocity. The process further includes releasing microscopic air bubbles into the raw water at the center of the tank and distributing this water and bubbles to the rotating lines.

These and other features and objects will be more fully understood from the following detailed description which should be read in light of the accompanying drawings.

DETAILED DESCRIPTION OF THE PREFERRED EMBODIMENTS

Figure 1:
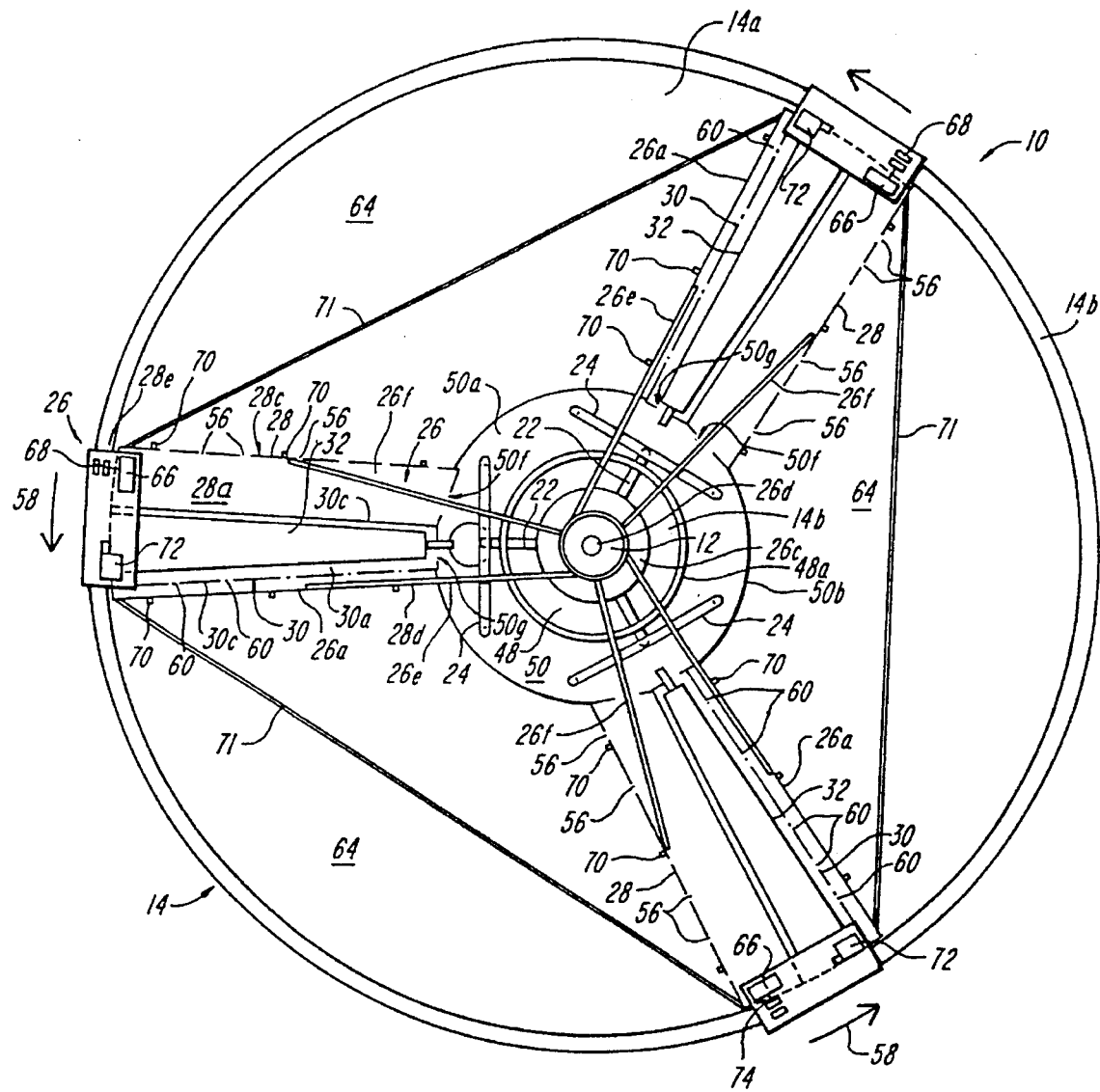
FIG. 1 is a top plan view of a high capacity, single tank water clarification system according to the present invention.

FIGS. 1–4 show a high capacity, single tank water clarifier 10 according to the present invention. It operates on the flotation principal to treat raw water containing suspended solid contaminants. Raw water is fed by an inlet or supply line 12 to a generally circular tank 14 where the clarification occurs. Clarified water flows out of the clarifier via an outlet conduit 16. A feed line 18 adds a flocculating agent such as alum to the raw water supply line 12. Pressurized water with one to two percent dissolved air is introduced via a supply ring 20, bridging distribution arms 22, and outlet manifolds 24. Each manifold 24 has a set of outlets 24a with a narrow exit orifice. As is well known in the art, the pressure drop experienced by the water exiting through this narrow orifice releases the dissolved air in the form of a high density of microscopic bubbles. The unit 10 includes a spider-like carriage 26 that supports and rotates a set of headers 28, extractors 30 and sludge removal scoops 32 arrayed in three radially extending arms 26a,26a,26a.

As shown, the tank 14 is set in a pre-existing, circular sedimentation tank 34. To retrofit the tank 34, back fill 36 with an overlying layer 38 of poured concrete fills the tank 34 yielding a flat bottom that supports a bottom wall 14a of the flotation tank 14. The tank 14 is shallow. A typical depth for the water w held in the tank 14 is sixteen to eighteen inches. The tank as shown has a diameter of forty five meters, although it will be understood that the diameter and depth can vary. If the tank 14 is not so retrofit, its generally flat bottom wall 14a can be supported on steel I beams or any of a wide variety of structures. Because the water in the tank is shallow, it does not have the large mass of a comparably sized sedimentation tank filled with water to a much greater depth. An outer wall 14b is generally circular. Several sumps 40 formed in the bottom wall 14a collects large particulate matter that settles in the tank 14 despite the flotation process. A sedimentation rake 42 sweeps the sedimentation along the bottom wall to the sumps. Conduits 44,44 carry the sediment from the clairifier 10.

The raw water supply line 12 is centered within the tank 14. An upwardly directly flow spills over into a fixed trough 48 defined by the innermost portion of the bottom wall 14a and a circular outer wall 48a. As shown the trough 48 has a diameter of about 15 m and the outer wall has a height of 0.8 m. The dissolved air ring 20 is located in the trough. It is fed by a conduit 20a extending through the bottom wall of the trough. The arms 22 bridge the outer wall to carry pressurized and aerated water to manifolds 24. Their outlets 24a are immersed in water held in a rotating trough 50 that surrounds the fixed trough 48 concentrically. In the first tank the turbulence of the raw water is dissipated and the alum is mixed with the raw water. The height of the outer wall 48a sets the water level, and to some degree controls the flow of the raw, alum-treated water, because raw water is fed outwardly to the trough 50 by overflowing the wall 48a.

Figure 3:
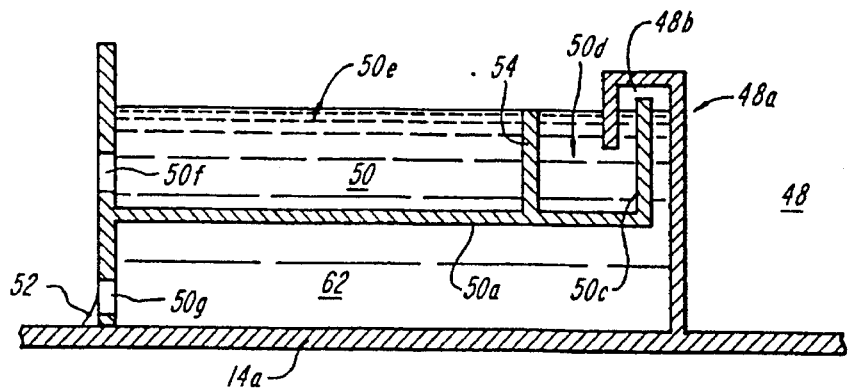
FIG. 3 is a detailed view of the rotating water aeration and distribution tank shown in FIGS. 1 and 2.
Figure 4:
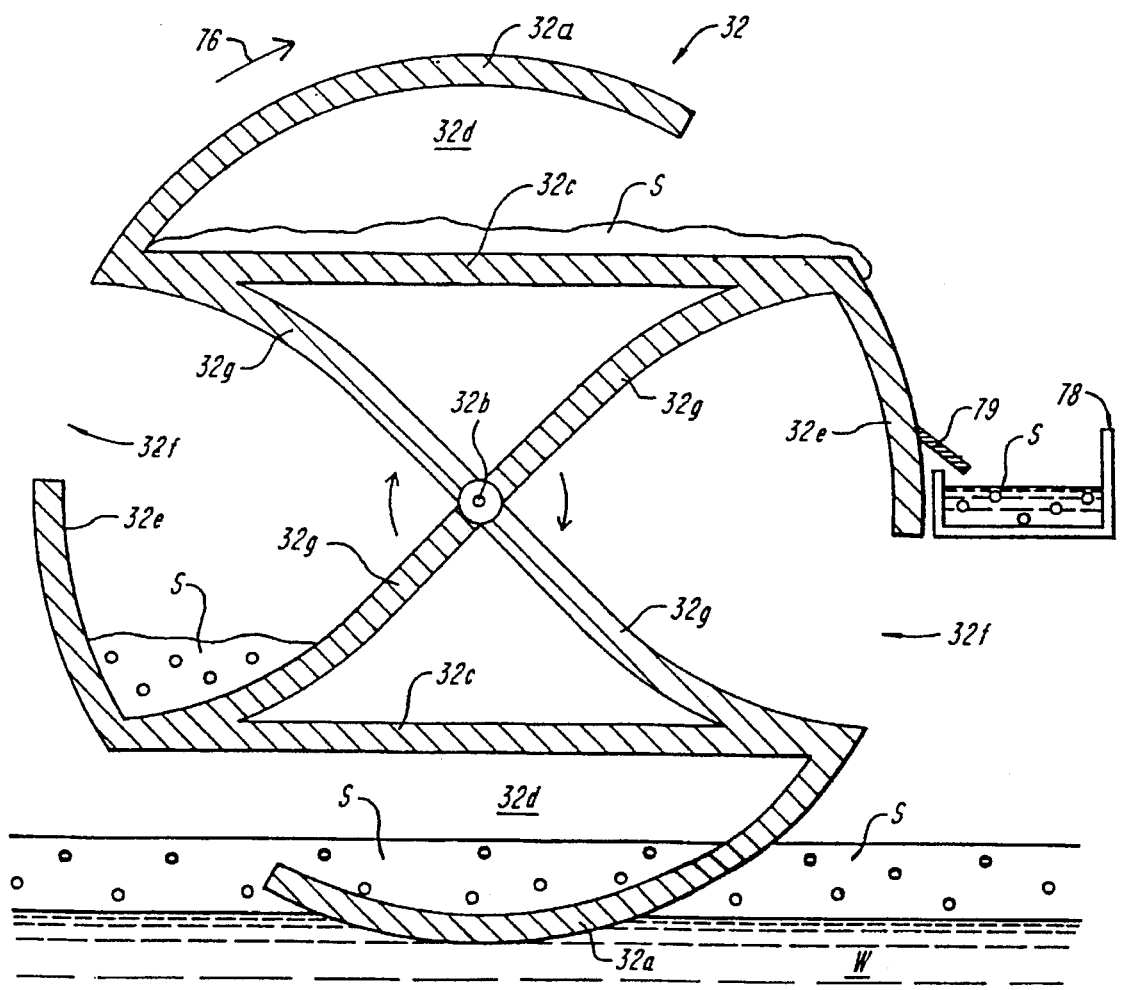
FIG. 4 is a simplified end view of one form of rotating scoop that collects floated sludge and lifts it.

The rotating trough 50 has a bottom wall 50a, an outer wall 50b and an inner wall 50c. The outer wall has a resilient skirt 52 that is in a sliding contact seal with the bottom wall 14a of the tank that blocks an inward flow of water from the tank. The wall 50b extends above the height of the wall 48a to block a direct outward flow of the water from the trough 50 to the tank by simply overflowing this wall. As best seen in FIG. 3, the outer wall 48 has a downwardly open recess 48a at its outer surface that receives the upper edge of he rotating inner wall 50c. This arrangement provides a sliding seal that blocks water on either side of the wall 50c from flowing back into the trough 48. Also, a circular weir 54 confines the turbulent spilled over water in a region 50d of the trough. The water moves to the main region 50e of the trough 50 by flowing over the top edge of the weir. The raw water held in the trough region 50e is then chemically treated, aerated with microscopic air bubbles, isolated from the turbulence of the infeed, and has its level automatically controlled by the walls 48a and 50b.

A set of the hollow, box-like headers 28 constitute another principal feature of this invention. They each extend radially across the tank 14 from the wall 50b down to the wall 14b. Each header has upper and lower walls 28a, 28b, front and rear walls 28c, 28d and an end wall 28e. At this inner end, each header is in fluid communication with the trough region 50e through an aligned opening 50f in the outer wall 50b. The walls 28a–28d are preferably mounted on and sealed to the wall 50b. A set of outlets 56 set in the rear wall 28d direct the treated water flowing radially within the header and exit to the tank via the outlets 56. The outlets are oriented so that the flow to the tank is in a direction generally opposite to that of the header itself as indicated by arrow 58. The size and orientation of the outlets is selected in conjunction with the rate of rotation of the header to produce a net zero velocity of the treated water as it enters the tank. This avoids turbulence and is conducive to producing a generally vertical path of flotation for the bubbles and the particulate contaminants adhering to the bubbles. Both of these conditions are in turn conducive to a rapid clarification of the water in a shallow depth.

The headers are flat, wide circumferentially, and have an internal cross sectional area that increases slightly as a function of radius to facilitate a uniform pressure drop along the header. This uniformity, in conjunction with a mutual spacing of the outlets that decreases as a function of the radius along the header promotes a distribution of treated water inlet flow to the tank that is generally uniform radially across the tank. The flow is uniform as a function of the volume of raw water input to a unit volume of the tank swept out by the header as it rotates. The end result is that each unit volume of the tank receives about the same volume of treated water regardless of the location of the unit volume within the tank. The flatness of the tank helps to reduce turbulence due to movement of the header within the tank. The width allows a uniform, laminar flow of the treated water radially within the header. The flatness—a typical value being 50 cm—also allows the headers to rotate in an upper half of the tank while the extractors rotate in a lower half.

The extractors 30 are of generally the same construction as the headers except that they have inlets 60 located on their front wall 30c, and have no outlets or inlets on their rear wall 30d. The inlets are located, spaced, sized and oriented to receive clarified water from a region near the bottom wall of the tank. The extractor directs the inflowing water radially, along the hollow interior of the extractor, to an opening 50g in the trough wall 50b that communicates only with an associated one of the extractors. Water flowing through each opening 50g enters an annular clarified water collection compartment 62 defined by the lower portion of the wall 14a, the outer wall 48a, the recess 48b, the inner wall 50c received in the recess, and the rotating trough bottom wall 50a. The compartment 62 collects water from all the extractors and feeds it to the outlet 16, which passes through the layer 38, backfill 36 and sedimentation tank 34.

The extractors extend radially across the tank and lie in a lower half of the tank. Their flat profile also aids in reducing turbulence due to the movement through the water. Each extractor removes clarified water from sector 64 of the tank 14 defined between that extractor and the rotationally preceding header. To make maximum use of the tanks, each extractor precedes only slightly the distributor supply treated raw water to the following sector 64. This close grouping of extractors and headers facilitates supporting and rotating them in unison on the carriage 26. The comparatively large and radially increasing circumferential width of each extractor accommodate the rapid influx of clarified water from entire tank, and especially the relatively larger influx from the outer regions where there is a greater volume of water swept out by the rotating extractor in a given interval than closer to the wall 50b.

The carriage 26 has a central support post 26a, a central bearing 26b, a circular mounting platform 26c mounted on the bearing for free rotation about the post 26a, a rotary electrical joint 26d that connects electrical power to the carriage, and a pair of generally radially directed support arms 26e, 26f associated with each header-extractor pair. Motors 66 drive wheels 68 propel the carriage 26 and the headers 28, extractors 30, scoops 32 and trough 50 mounted on the carriage to rotate in unison. Idler wheels 70, typically six, roll on the bottom wall 14a and support each header-extractor-scoop set. Cables 71 extend between the ends of adjacent arms of the carriage to ensure that the carriage moves in unison with a uniform angular spacing between its arms.

Figure 2:
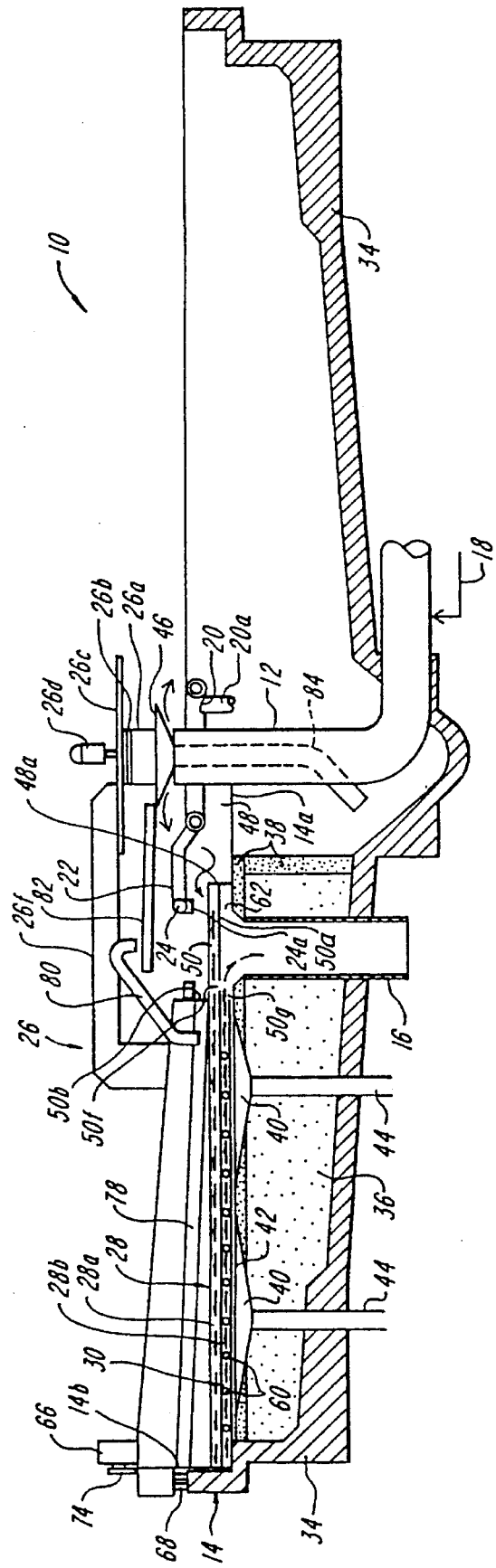
FIG. 2 is a view in vertical section taken along the line 2—2 in FIG. 1.

The carriage 26 also supports the scoops 32 and rotates them around the tank over the surface of the water w held in the tank. A motor 72 and chain or belt drive 74 located on each assembly 26g rotate the scoop about its own longitudinal axis, as indicated by arrow 76 in FIG. 4. The scoop can be one of a known, multi-blade type described in U.S. Pat. No. 4,184,567. In this scoop, multiple curved blades skim floated sludges from the surface of the tank. Continued rotation directs the scooped sludge to a central passageway that is inclined to gravity feed the sludge to a central collection point. In the preferred form shown in FIG. 4, each scoop has two diametrically opposed blades 32a that have a generally truncated conical configuration that rotate about a common axis of rotation 32b. Interior walls 32c lying along a "chord" form a compartment 32d that holds the sludge until the sludge scooped at the 6 o'clock position as shown is raised to a dumping position, at about one to three o'clock as shown. A radially extending sludge trough 78 receives the dumped sludge. The trough 78 is inclined to gravity feed the sludge toward an end adjacent the wall 50b. A fixed blade 79 guides the dumped sludge from the compartments to the trough 78. The scoop itself is also inclined in the same direction, as best seen in FIG. 2. The lifting action of the compartments 32d thus allows the inclination of the scoop to be added to that of the trough 78 to obtain a better gravity feed than with either acting alone.

The scoop 32 also has a set of diametrically opposed blades 32e,32e that also have a truncated conical configuration with one edge joined with an end of one of the walls 32c. Sludge enters the scoop at the openings 32f,32f. Continued rotation carries the sludge onto interior walls 32g, 32g. Still further rotation dumps the sludge into the trough 78, again at the one to three o'clock positions. Rotation of this scoop 32, having a diameter at its outer end of 80 to 100 cm and diameter at its inner end of 40 to 50 cm and rotated at about 1 revolution per minute has been found about to remove the accumulated floating sludge from surface of the tank at a rate that can keep up with the high volume of clarification per unit surface area occuring in the tank.

A sludge lift 80 transports the sludge accumulating at the lower end of each of the troughs 78 to a further trough 82 that is also inclined toward the center of the clarifier 10. The troughs 82 carry the sludge from the outlet of the lift 80 to the funnel 46 feeding the sludge outlet conduit 84 that extends vertically alongside the raw water inlet pipe. The sludge lift can take a variety of forms, but a simple and preferred form is a conduit with an associated pump. The lift gives the sludge additional height to be able to flow downhill to the center of the tank despite an inclined, downhill travel to reach the wall 50b. It also allows the sludge to clear the water aeration and distribution functions occuring in the troughs 48 and 50. The lift 80 and the associated troughs 82 are supported from the carriage with mounting arms not shown for clarity.

Viewed broadly as a process, the present invention involves clarifying water by flotation simultaneously in multiple angular sectors of a single, generally circular tank. This broad process is implemented by distributing treated raw water to the tank along generally plural radial lines (corresponding to the lines of outlets on the headers 28) that rotate through the tank. The process also involves simultaneously extracting clarified water from the tank from each sector, also along plural, generally radial, rotating lines in the tank (corresponding to the lines of inlets of the extractors 30). The distributing is preferably with a net zero velocity. The distributing also preferably includes introducing dissolved air to the raw water at a central region in the tank to produce the microscopic air bubbles in the raw water and then distributing this treated, aerated water along the radial rotating lines. The process of this invention also includes removing floated sludge from the tank. This removal is also preferably along plural rotating lines each associated with one of said distributing lines and one of said extracting lines.

In operation, the headers, extractors and scoops are preferably of like number and rotated about the center of the clarifier 10 in unison at about 1/10 to 1/20 revolution per minute. With a forty-five meter diameter tank having a depth of sixteen to eighteen inches, and with the headers, extractors and scoops rotating at about 1/10 revolution per minute, and using three headers, three extractors and three scoops to define three clarification sectors 64 within the tank, it is possible to clarify in the range of 100 to 130 liters per square meter, about four to six times the rate possible with settling tanks of the same area. Looking at throughput capacity, this clarifier 10 utilizing the present invention can process eight to nine cubic meters of raw water per second. This is twelve to thirteen times the throughput of the largest commercially available SPC unit, namely, 0.73 $m^3$/sec., or 44.07 $m^3$/min., or 11,800 gallons per minute for a seventy foot diameter tank. The clarifier 10 of this invention, with one unit having a 45 m diameter, can clarify 184 $m^3$/min., or 265,000 $m^3$/day, or 70 million gallons per day. No known clarifier of any type can come close to this level of performance, and certainly not with this degree of compactness.

There has been described a water clarification apparatus and process which treats water at a higher throughput rate than has heretofore been possible using a comparable surface area for flotation removal of the suspended solid contaminants. The unit is compact, has a comparatively small weight and a favorable cost of manufacture, particularly when compared to collections of known sedimentation or even flotation clarifiers having the same treatment capacity. The apparatus of the invention avoids hydraulic rotary seals at the inlets. It also has an automatic water level control at the raw water feed. Further, the invention can readily retrofit existing sedimentation tanks to increase their performance greatly with no increase in space utilization and using existing feed lines.

While this invention has been described with respect to its preferred embodiments, it will be understood that various modifications and alterations will occur to those skilled in the art from the foregoing detailed description and the accompanying drawings. For example, while the invention has been described with respect to flat, wide, box-like headers that receive treated water the header can have other configurations, such as a circular or oval cross section, and the outlets carried on the header can include the narrow gap to create the microscopic bubbles directly in the tank, these arrangements, however, are viewed as similar but less efficient in the efficiency of their distribution and the reduction of turbulence in the tank. Similarly, water extraction can be accomplished using pipes or other conduits of a variety of shapes, and with the inlets at the bottom, upper or even trailing surfaces. It is also possible to utilize a variety of other arrangements to treat and distribute the raw water to the headers. Further, while the headers and extractors have been described as extending along substantially taught radial lines, they could be curved with respect to a radial line. These and other variations and modifications are intended to fall within the scope of the appended claims.

What is claimed is:

1. In an improved flotation process for continuously clarifying high flow rates of raw feed water that has been treated with water containing dissolved air that is released as microscopic bubbles in the water to form an aerated raw water, the bubbles floating particles of contaminants suspended in the water held in a shallow tank to the surface of the water in the tank where they form a floating layer of sludge that is periodically removed from the surface and thereby achieving a flotation clarification of the raw water in the tank, and removing clarified water from the bottom portion of the tank, the improvement comprising distributing said aerated raw water to the tank along plural, angularly spaced and generally radial lines immersed in the water in the upper half in the tank, removing said clarified water along plural angularly spaced and generally radial lines immersed in the water in the lower half of the tank, rotating said lines of distribution and removing about the tank in unison to create plural rotating sectors within the tank each defined by one line of distribution and the following line of removing and simultaneously carrying out the flotation clarification in said plural sectors of the tank.

2. The improved process of claim 1 wherein said distributing is along at least two of said rotating lines, and wherein said clarified water removing is along a like number of said rotating lines.

3. The improved process of claim 2 wherein said simultaneous flotation clarification includes removing the floated sludge at a like plurality of angularly spaced, generally radially extending, rotating lines that move in unison with one set of said distributing and clarified water removing lines.

4. The improved process of claim 2 wherein said distributing is with a net zero velocity.

5. The improved process of claim 2 wherein said distributing comprises releasing the dissolved air as microscopic bubbles in a supply of the water near the center of the tank, and distributing the water and bubbles into the tank along said rotating line.

* * * * *